US008027487B2

(12) United States Patent
Park

(10) Patent No.: US 8,027,487 B2
(45) Date of Patent: Sep. 27, 2011

(54) METHOD OF SETTING EQUALIZER FOR AUDIO FILE AND METHOD OF REPRODUCING AUDIO FILE

(75) Inventor: Gun-han Park, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 1386 days.

(21) Appl. No.: 11/544,583

(22) Filed: Oct. 10, 2006

(65) Prior Publication Data

US 2007/0127739 A1   Jun. 7, 2007

(30) Foreign Application Priority Data

Dec. 2, 2005 (KR) .................. 10-2005-0116895

(51) Int. Cl.
*H03G 5/00* (2006.01)
(52) U.S. Cl. .......... 381/103; 381/98; 381/101; 704/228; 704/234
(58) Field of Classification Search .............. 381/61, 381/62, 63, 98, 101, 102, 103, 104, 107, 381/106; 704/233, 228, 226, 203, 236
See application file for complete search history.

(56) References Cited

U.S. PATENT DOCUMENTS

| 4,458,362 | A | * | 7/1984 | Berkovitz et al. | 381/103 |
| 4,661,982 | A | * | 4/1987 | Kitazato et al. | 381/103 |
| 5,592,450 | A | * | 1/1997 | Yonemitsu et al. | 386/96 |
| 6,061,318 | A | * | 5/2000 | Hwang | 369/53.23 |
| 6,343,182 | B1 | * | 1/2002 | Kim et al. | 386/126 |
| 6,577,739 | B1 | * | 6/2003 | Hurtig et al. | 381/316 |
| 6,831,881 | B2 | * | 12/2004 | Patil et al. | 369/30.18 |
| 7,225,125 | B2 | * | 5/2007 | Bennett et al. | 704/233 |
| 7,471,988 | B2 | * | 12/2008 | Smith et al. | 700/94 |
| 2001/0016046 | A1 | * | 8/2001 | Ohta | 381/98 |
| 2002/0035407 | A1 | * | 3/2002 | Ishito et al. | 700/94 |
| 2006/0092803 | A1 | * | 5/2006 | Tatsuzawa et al. | 369/59.22 |
| 2007/0094016 | A1 | * | 4/2007 | Jasiuk et al. | 704/219 |

FOREIGN PATENT DOCUMENTS

| JP | 7-284185 A | 10/1995 |
| KR | 10-2004-0041850 A | 5/2004 |
| WO | WO 03/023786 A2 | 3/2003 |

\* cited by examiner

Primary Examiner — Vivian Chin
Assistant Examiner — Friedrich W Fahnert
(74) Attorney, Agent, or Firm — Sughrue Mion, PLLC

(57) ABSTRACT

A method of setting an equalizer so as to enlarge a sound field in reproducing an audio file and a method of reproducing an audio file thereby, includes: dividing an input audio file into segments with a predetermined time length; extracting an audio feature value for each segment; determining equalizer information for reproducing each segment by the use of the extracted feature value; and determining an equalizer sequence for the audio file by the use of the determined equalizer information of each segment. Since the equalizer setting information can be automatically changed without user manipulation, the user can listen to an audio file of which the sound field is dynamically enlarged.

11 Claims, 6 Drawing Sheets

METHOD OF SETTING EQUALIZER FOR AUDIO FILE AND METHOD OF REPRODUCING AUDIO FILE

CROSS-REFERENCE TO RELATED PATENT APPLICATION

This application claims the benefit of Korean Patent Application No. 10-2005-0116895, filed on Dec. 2, 2005, in the Korean Intellectual Property Office, the disclosure of which is incorporated herein in its entirety by reference.

BACKGROUND OF THE INVENTION

1. Field of the Invention

The present invention relates to setting an equalizer for an audio file, and more particularly, to a method of setting an automatically adjustable equalizer so as to enlarge a sound field in reproducing an audio file and a method of reproducing an audio file thereby.

2. Description of the Related Art

An equalizer is a device for enlarging a sound field according to features of the music by amplifying a specified value in a frequency domain. Generally, equalizers modify an audio file by dividing an audio band into sub-bands. The equalizers are classified into graphic equalizers and parametric equalizers based on their structure. Operations of both kinds of equalizer are set by three parameters, which are mean frequency, bandwidth, and a level variation. In a graphic equalizer, mean frequency and bandwidth are fixed and only the level can be adjusted. The graphic equalizer has been used widely in audio file players such as MP3 players. In a parametric equalizer, the three parameters can be adjusted independently, so manual adjustment is difficult.

The most general method of setting an equalizer is by manually setting the equalizer setting information. FIG. 1 shows a conventional window for manually setting equalizer information. Referring to FIG. 1, when an equalizer setting menu (EQ) 112 is selected in an audio file player 110, a pre-set graphic equalizer setting window 130 is displayed. A user can adjust a level with respect to each frequency by moving a tab 132. However, since this operation has to be performed for each piece of music, it is troublesome. In addition, it is difficult for a user to adequately set an equalizer without knowledge of the music.

Another general method of setting an equalizer involves selecting equalizer setting information in a pre-set equalizer list, as shown in FIG. 2. A user selects a corresponding menu "PRESETS" 134, and then selects one of the pre-set equalizer information settings, which is thought to be suitable for the piece of music to be listened to, thereby setting the equalizer. Although this method is more convenient than the method in FIG. 1, this method still requires user manipulation. The entire selection is reproduced based on the selected equalizer setting information, so bars and segments for which the equalizer setting information is not suitable may exist.

In Korean Unexamined Patent Application Publication No. 2002-82512, a method of reading genre information recorded in an audio file header and performing equalization corresponding to the genre when an audio file is reproduced is disclosed. In this case, although user manipulation is not needed, whole selections are reproduced by setting an equalizer by genre, so segments for which the setting of the equalizer is not suitable may exist.

SUMMARY OF THE INVENTION

The present invention provides a method of setting an equalizer in which an equalizer setting operation is automatically performed without a user's manipulation, by determining equalizer information suitable for each segment and automatically changing the equalizer information when reproducing an audio file, and a method of reproducing the audio file using the method.

The present invention also provides a method of setting an equalizer for an audio file in which an equalizer sequence including equalizer information of segments of the audio file to be reproduced is generated, with reference to an equalizer information database storing equalizer information suitable for a feature value of each audio segment.

According to an aspect of the present invention, there is provided a method of setting an equalizer for an audio file, including: dividing an input audio file into segments with a predetermined time length; extracting an audio feature value of each segment; determining equalizer information for reproducing each segment by the use of the extracted feature value; and determining an equalizer sequence for the audio file by the use of the determined equalizer information of each segment.

The determination of equalizer information for reproducing each segment may include determining the equalizer information of each segment by searching a database storing information of a reference equalizer setting for a record most similar to the extracted audio feature value.

The determination of an equalizer sequence may further include interpolating equalizer parameter values between two neighboring segments, when the equalizer parameter values corresponding to the same frequency band of the two neighboring segments among the determined equalizer information of each segment are different by more than a predetermined amount.

The interpolating may include: dividing all or a part of the two neighboring segments into a plurality of sub-segments; and allocating a gradually varying equalizer parameter value to the frequency band of each sub-segment.

According to another aspect of the present invention, there is provided a method of reproducing an audio file, the method including: receiving an audio file; acquiring an equalizer sequence including equalizer information of segments of the audio file; converting a PCM waveform obtained by decoding the audio file into frequency domain information; applying the equalizer sequence to the frequency domain information and generating a modified frequency domain information; and converting the modified frequency domain information into the PCM waveform and reproducing the PCM waveform.

BRIEF DESCRIPTION OF THE DRAWINGS

The above and other features and advantages of the present invention will become more apparent by describing in detail exemplary embodiments thereof with reference to the attached drawings in which.

DETAILED DESCRIPTION OF THE INVENTION

Now, an exemplary embodiment according to the present invention will be described in detail with reference to the accompanying drawings.

Figure 1:
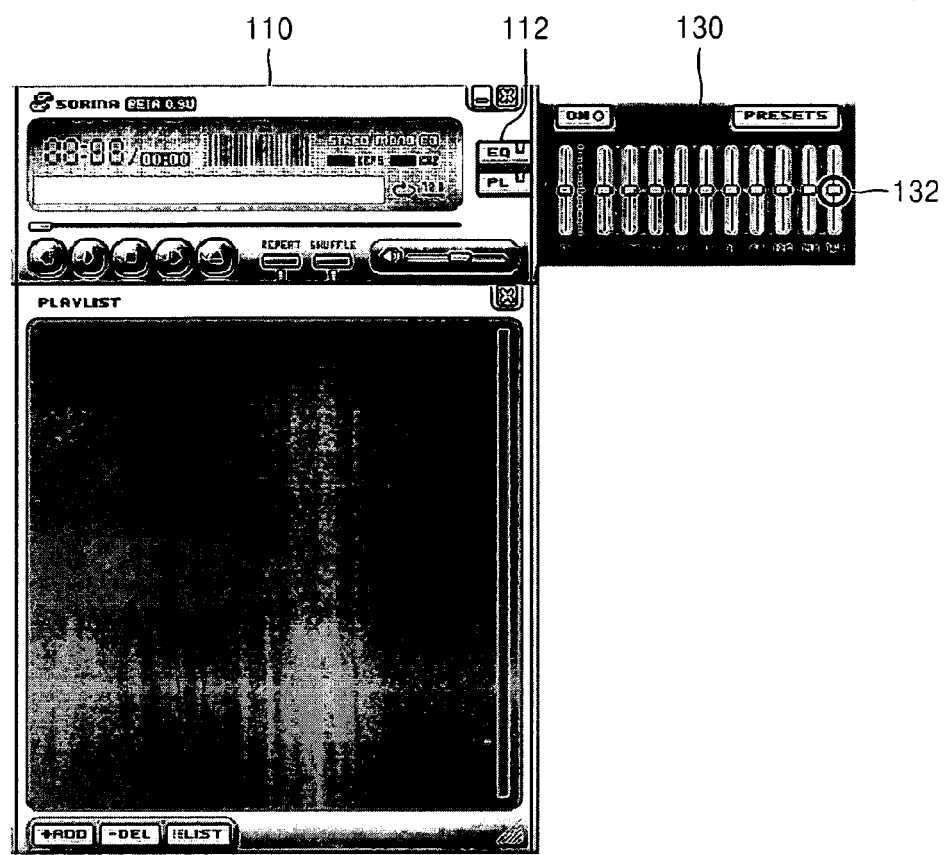
FIG. 1 shows a conventional window for manually setting equalizer information.
Figure 2:
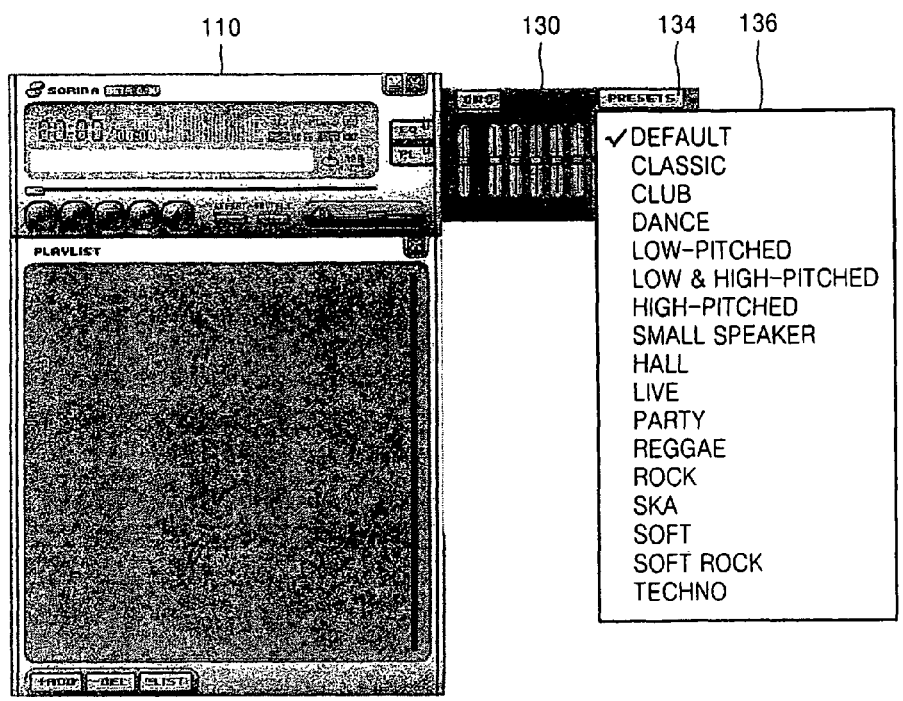
FIG. 2 shows a window for selecting equalizer setting information in a conventional pre-set equalizer list.
Figure 3:
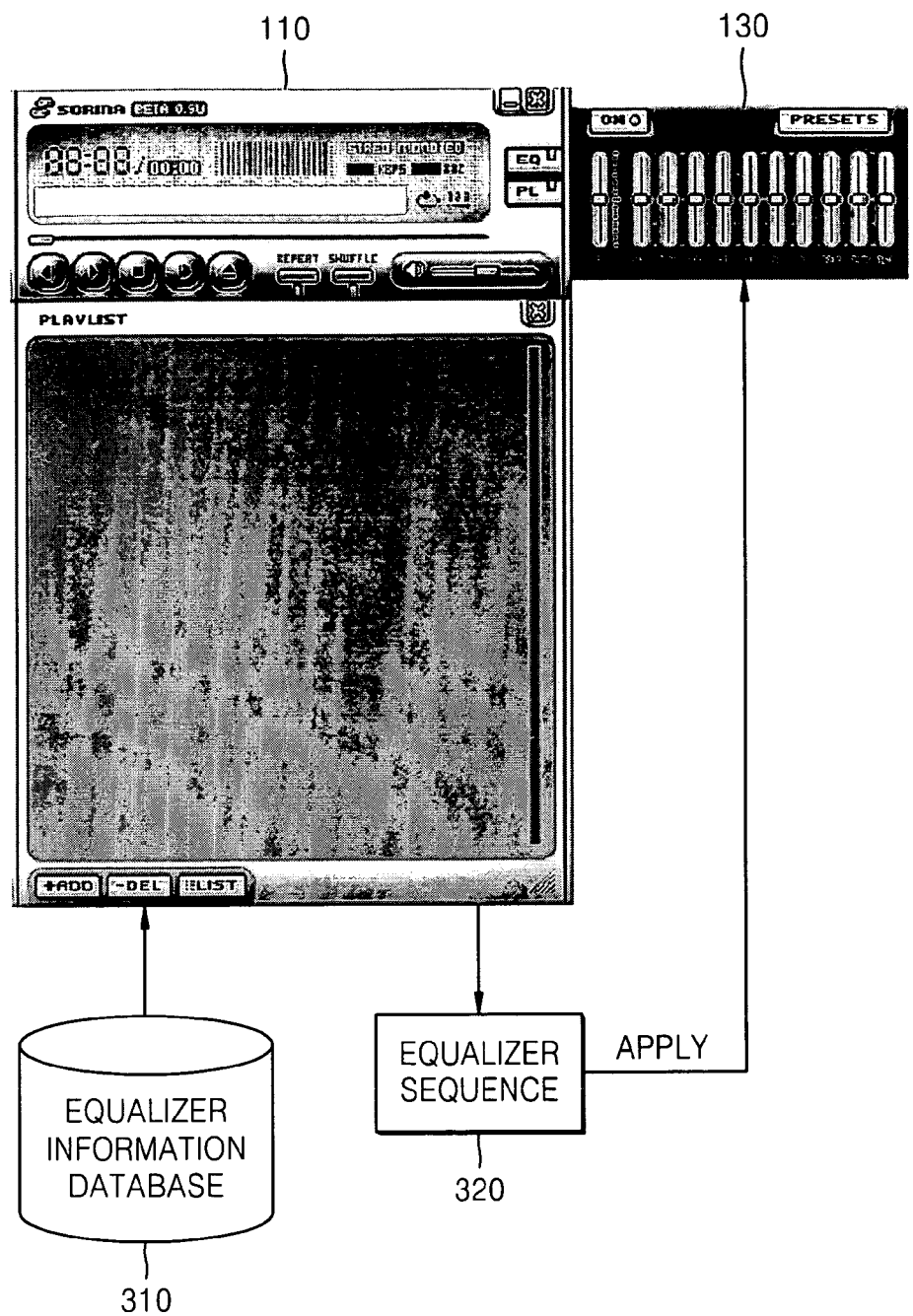
FIG. 3 shows a window for automatically changing equalizer setting information by the use of an equalizer sequence according to the present invention.

FIG. 3 shows a window for automatically changing equalizer setting information by the use of an equalizer sequence according to the present invention.

Referring to FIG. 3, an audio file player 110 generates an equalizer sequence 320 for an audio file to be reproduced, with reference to database 310 storing information of a reference equalizer. The audio file player 110 reproduces the audio file by operating the equalizer 130 according to this sequence 320. An audio feature value of an audio segment and equalizer information corresponding to the feature value are predetermined and stored in the equalizer database 310. The equalizer sequence 320 is used for setting equalizer information dependent on the feature value of the audio segment, and reproducing the audio file. The equalizer information includes an equalizer parameter such as a level with respect to each frequency band. The audio feature value is a value relating to audio frequency, audio harmonics, and so on.

Figure 4:
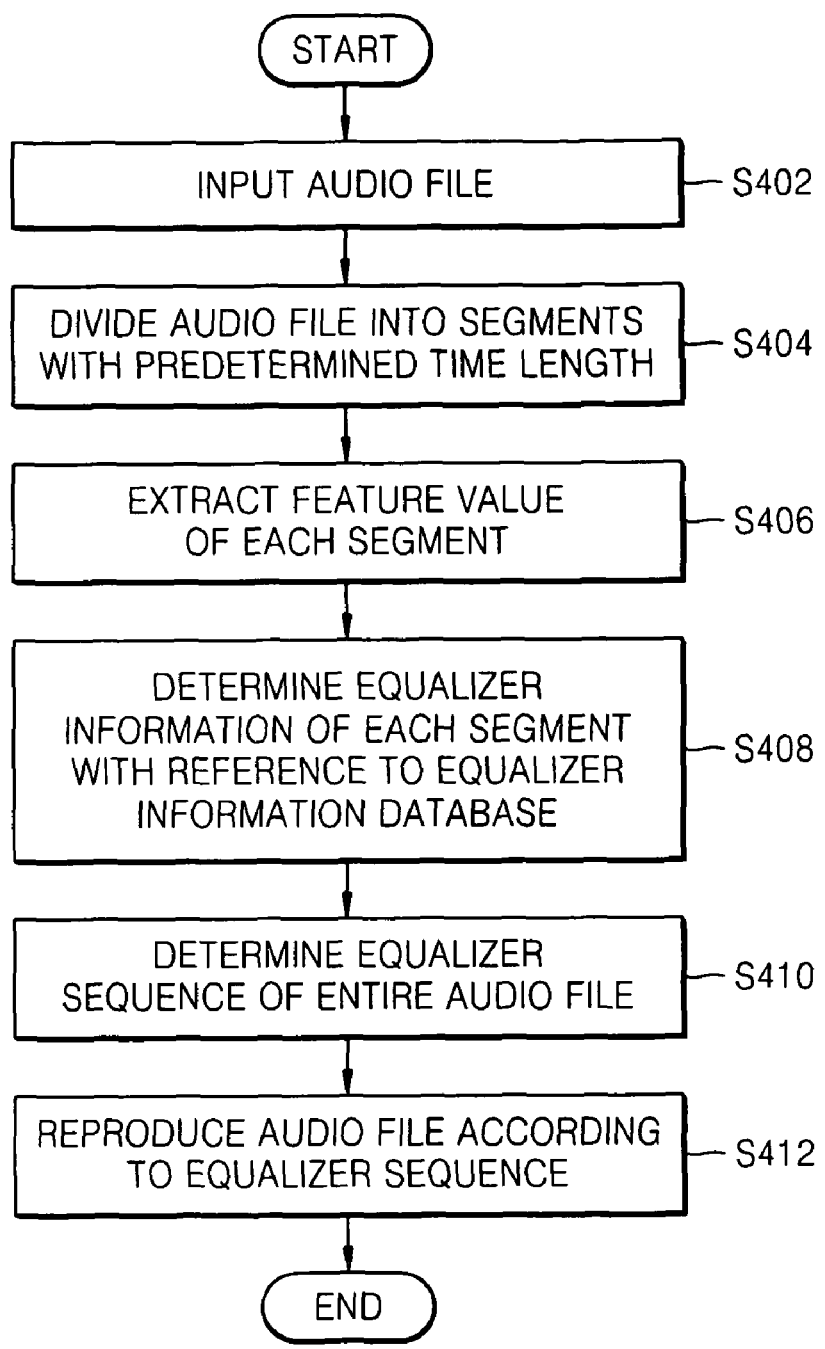
FIG. 4 is a flowchart showing a method of setting an equalizer according to the present invention.

FIG. 4 is a flowchart showing a method of setting an equalizer according to the present invention.

Referring to FIG. 4, at first, an audio file is input (S402). A format of the audio file according to the present invention is not limited to a specified format and may be MPEG Audio Layer-3 (MP3), Ogg Vorbis (OGG), Windows Media Audio (WMA), or so. The input audio file is divided into a plurality of segments with a predetermined or otherwise determined time length (S404). For example, a 3-minute music file is divided into 18 segments with a 10-second length. The audio feature value is extracted for each segment (S406). The algorithm for extracting the feature value may vary, and the feature values may be, for example, Mel-Frequency Cepstral Coefficients (MFCC), Bark-scale Frequency Cepstral Coefficients (BFCC), Spectral Centroid, Spectral Flux, or Delta of Cepstral Coefficients.

Next, the equalizer information corresponding to the same feature value as the extracted feature value, or the most similar feature value to the extracted feature value is determined as the equalizer information for the corresponding segment by searching the equalizer information database (S408). The equalizer information for all segments constitutes an equalizer sequence of an entire audio file (S410). The audio file is reproduced by changing the equalizer setting for each segment according to the determined equalizer sequence (S412).

Figure 5:
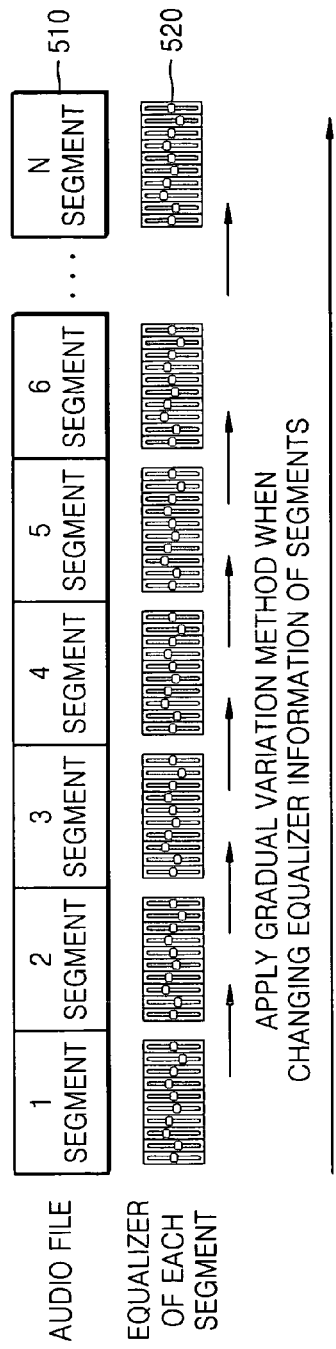
FIG. 5 shows a pattern in which an equalizer sequence is applied to an audio file according to the present invention.

FIG. 5 shows a pattern in which an equalizer sequence is applied to an audio file according to the present invention. Referring to FIG. 5, the audio file is divided into N segments 510. In addition, the equalizer sequence 520 in which the equalizer setting information of each segment is enumerated is applied in reproducing the audio file.

On the other hand, if the equalizer parameter value is varied sharply when moving from one segment to the next segment, the sound field is varied suddenly to generate unnatural sound, so it is necessary to modify the equalizer sequence. When parameter values corresponding to the same frequency band of two neighboring segments are different by more than a predetermined amount, the parameter values between the two segments are interpolated to vary gradually. For this, the two segments are divided into sub-segments, and a gradually varying parameter value is allocated to each sub-segment to generate a modified equalizer sequence. The sub-segmentation is performed by dividing all or a part of the two neighboring segments into a plurality of sub-segments. That is, one of the two neighboring segments may be divided into a plurality of sub-segments, or both segments may be divided into a plurality of sub-segments. In addition, the equalizer sequence may be modified so that only parts of the two segments which are adjacent to the boundary of the two neighboring segments are divided into sub-segments, and the parameter value in these parts varies gradually.

Figure 6:
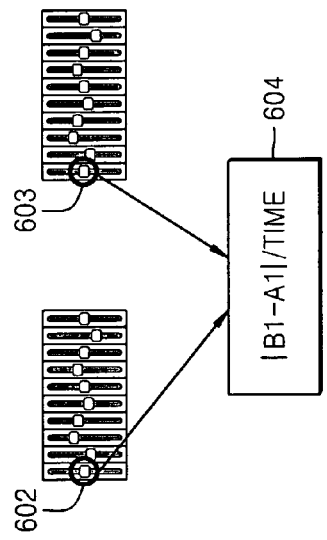
FIG. 6 shows an example of a method of calculating an equalizer parameter for smoothly changing equalizer setting information.

FIG. 6 shows an example of a method of calculating an equalizer parameter for smoothly changing equalizer setting information. Referring to FIG. 6, linear interpolation by the use of the following mathematical expression 1 is applied to parameter values A1 and B1 corresponding to the same frequency band 602 and 603 of the two neighboring segments.

$$|B1-A1|/time \quad \text{[Mathematical expression 1]}$$

Referring to mathematical expression 1, a time rate of the parameter value is evaluated by dividing the difference between the equalizer parameter value A1 in the first segment and the equalizer parameter value B1 in the second segment by time, and parameter values in the sub-segments are evaluated by the use of the time rate. For example, in an embodiment where the audio file is divided into segments with a 10-second length, the variable (time) is set to 10 and only the equalizer information about the first segment can be modified, when the A1 is 0 dB and the B1 is 5 dB, the first segment is divided into 10 sub-segments with a 1-second length and the parameter value of each sub-segment is set so that the level for the corresponding frequency band is gradually varied at a rate of 0.5 dB per second. In the above example, although the variable (time) is set to the same value as the time length of the one segment, the variable may be set to another value.

Figure 7:
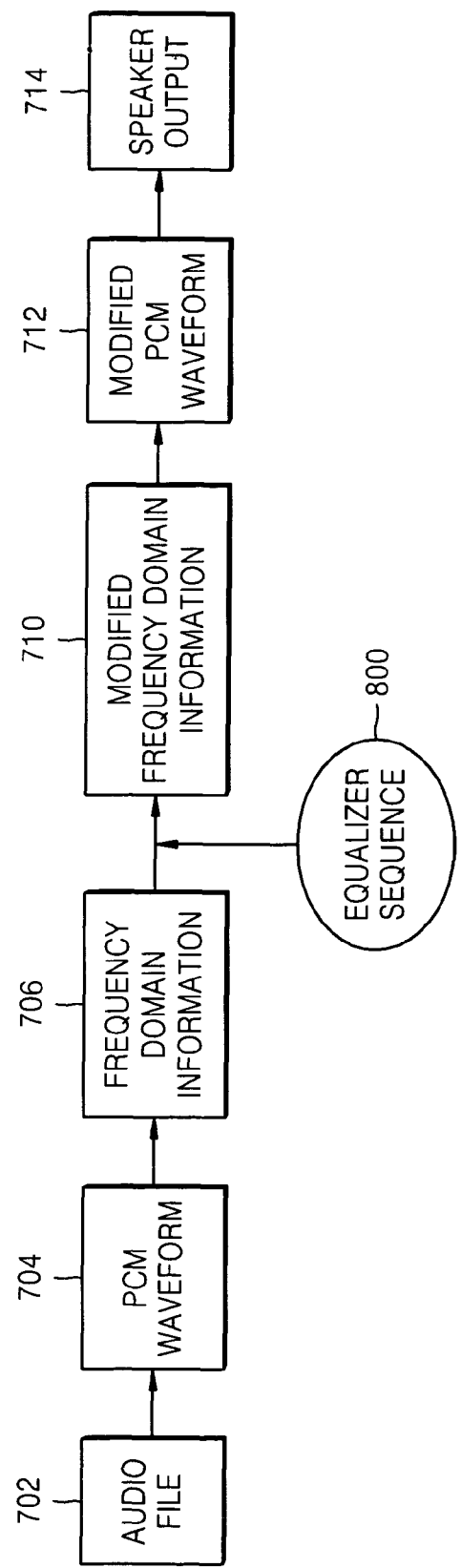
FIG. 7 shows a data conversion sequence during reproducing an audio file by the use of an equalizer sequence according to the present invention.

FIG. 7 shows a data conversion sequence during reproducing an audio file by the use of an equalizer sequence according to the present invention.

Referring to FIG. 7, an audio file 702 is decoded and converted into a PCM waveform 704. The PCM waveform 704 is converted into frequency domain information 706. The equalizer sequence 800, which is equalizer information for each time segment, is applied to the converted frequency domain information 706 to generate modified frequency domain information 710. This modified frequency domain information is re-converted into a PCM waveform and output to a speaker 714. The equalizer setting is automatically changed with respect to each segment when reproducing an audio file through these processes.

The invention can also be embodied as computer readable codes on a computer readable recording medium.

As described above, according to the present invention, the equalizer setting can be automatically changed without manual handling, and therefore a user can listen to an audio file of which the sound field is enlarged.

In addition, since the equalizer parameter value varies smoothly, although the difference between equalizer parameter values with respect to each segment is large, a user can listen to an audio file which varies smoothly, and will not detect any unnatural sound.

In addition, the present invention may be apply to any format of an audio file such as MP3, OGG, WMA and so on, and may be applied to any product dealing with digital audio files such as an MP3 player, a personal computer, a digital television, a mobile phone, Blu-ray Disc player, and so on.

What is claimed is:

1. A method of setting an equalizer for an audio file, the method comprising:
   dividing an input audio file into segments;
   extracting an audio feature value for each segment;
   determining equalizer information for reproducing each segment by the use of the extracted feature value; and determining an equalizer sequence of the audio file by the use of the determined equalizer information for each segment.

2. The method of claim 1, wherein the step of determining equalizer information comprises determining equalizer information for each segment by searching a database storing information of reference equalizer settings for a record most similar to the extracted audio feature value.

3. The method of claim 1, wherein the step of determining an equalizer sequence comprises interpolating equalizer parameter values between two neighboring segments, when the equalizer parameter values corresponding to the same frequency band of the two neighboring segments are different by more than a predetermined amount.

4. The method of claim 3, wherein the step of interpolating equalizer parameter values comprises:
   dividing all or a part of at least one of the two neighboring segments into a plurality of sub-segments; and
   allocating a gradually varying equalizer parameter value to the frequency band of each sub-segment.

5. A method of reproducing an audio file, the method comprising:
   receiving an audio file;
   acquiring an equalizer sequence including equalizer information on a series of segments of the audio file;
   converting a PCM waveform obtained by decoding the audio file into frequency domain information;
   applying the equalizer sequence to the frequency domain information and generating modified frequency domain information; and
   converting the modified frequency domain information into the PCM waveform and reproducing the PCM waveform.

6. The method of claim 5, wherein the step of acquiring an equalizer sequence comprises:
   dividing the audio file into segments;
   extracting an audio feature value of each segment;
   determining equalizer information for reproducing each segment by the use of the extracted feature value; and
   determining the equalizer sequence of the audio file by the use of the determined equalizer information for each segment.

7. The method of claim 6, wherein the step of determining equalizer information for reproducing each segment comprises determining equalizer information for each segment by searching a database storing information of reference equalizer settings for a record most similar to the extracted audio feature value.

8. The method of claim 7, wherein the step of determining the equalizer sequence further comprises interpolating equalizer parameter values between two neighboring segments, when the equalizer parameter values corresponding to the same frequency band of the two neighboring segments are different by more than a predetermined amount.

9. The method of claim 8, wherein the step of interpolating the equalizer parameter values comprises:
   dividing all or a part of at least one of the two neighboring segments into a plurality of sub-segments;
   allocating a gradually varying equalizer parameter value to the frequency band of each sub-segment.

10. The method according to claim 1, wherein the input audio file is divided into segments based on a predetermined time length.

11. The method according to claim 1, wherein the audio feature value comprises one of Mel-Frequency Cepstral Coefficients, Bark-scale Frequency Cepstral Coefficients, Spectral Centroid, Spectral Flux, and Delta of Cepstral Coefficients.

* * * * *